E. M. SPIEKERMAN.
SEALING DEVICE FOR PIPE JOINTS.
APPLICATION FILED AUG. 28, 1916.
1,240,507.
Patented Sept. 18, 1917.
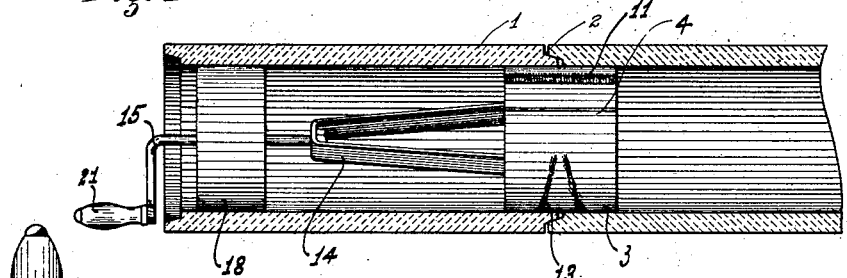
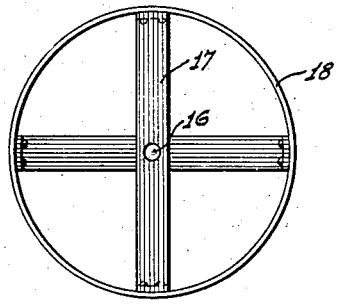
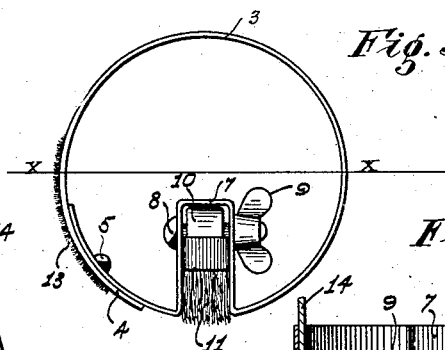
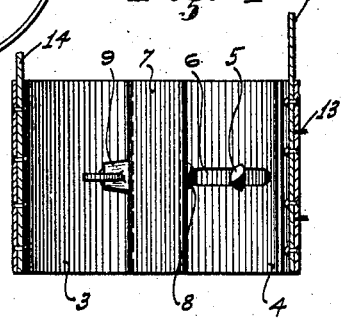
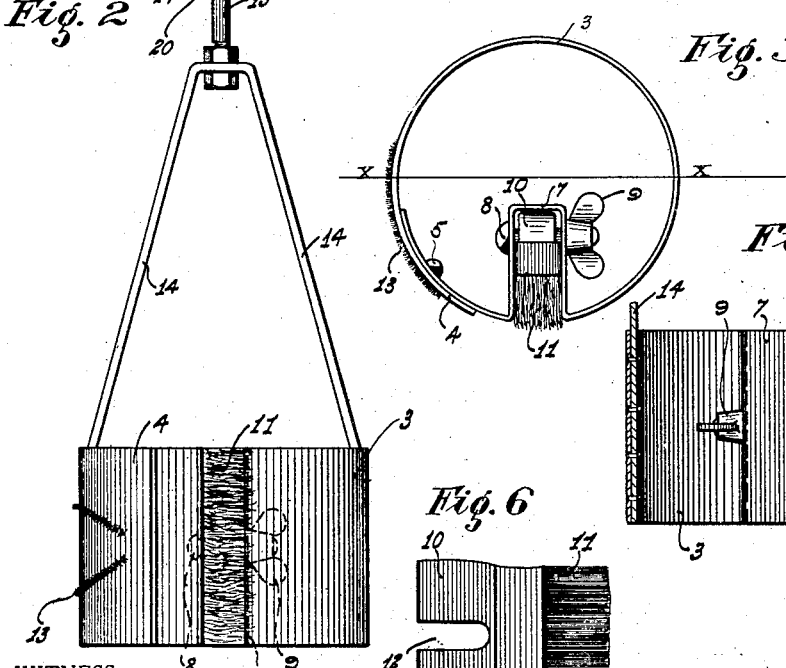
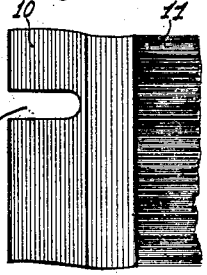
WITNESS
Clarence M. Smith
INVENTOR:
E. M. Spiekerman
BY
ATTORNEY

UNITED STATES PATENT OFFICE.

EWALD M. SPIEKERMAN, OF LODI, CALIFORNIA.

SEALING DEVICE FOR PIPE-JOINTS.

1,240,507.  Specification of Letters Patent.  Patented Sept. 18, 1917.

Application filed August 28, 1916. Serial No. 117,232.

*To all whom it may concern:*

Be it known that I, EWALD M. SPIEKERMAN, a citizen of the United States, residing at Lodi, in the county of San Joaquin, State of California, have invented certain new and useful Improvements in Sealing Devices for Pipe-Joints; and I do declare the following to be a full, clear, and exact description of the same, reference being had to the accompanying drawings, and to the characters of reference marked thereon, which form a part of this application.

This invention relates to improvements in tools used in connection with the sealing of cement, terra cotta, and other similar pipe joints, the object of the invention being to produce a device which will fit inside of the pipe adjacent the joint thereof and thoroughly force the sealing cement into the joint and then finally polish and clean the same so as to leave a good clean exposed surface, and one which will be thoroughly tight and allow of no leakage.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a sectional view of two pipe sections jointed together showing my improved sealing device in position therein ready for operation.

Fig. 2 is a side elevation of the device.

Fig. 3 is an end view of the sealing collar.

Fig. 4 is a sectional view taken on a line X—X of Fig. 3.

Fig. 5 is a plan view of a guide collar for the operating handle of the sealing collar.

Fig. 6 is a fragmentary view of a sealing brush.

Referring now more particularly to the characters of reference on the drawings, the numeral 1 designates the pipe sections and the numeral 2 a joint between adjacent sections. My improved device consists primarily of a split collar 3 having its free ends overlapping as at 4, the overlapping ends 4 being held adjacent each other by means of a set screw or rivet 5 fitted through an elongated slot 6 in one of the overlapping portions and being seated in the other.

The collar 3 has formed therein a recess 7 projecting across which is a pin 8 having on its outer end a wing nut 9. The numeral 10 designates a brush head having bristles 11, the said head 10 being provided with a slot 12. The head 10 is formed so as to be able to fit into the recess 7, the slot 12 fitting over the pin 8. The bristles 11 are positioned so as to extend slightly beyond the outer circumference of the collar 3 for a purpose as will presently appear. The brush head 10 is held within the recess 7 by tightening the wing nut 9 which clamps the sides of the recess 7 against the brush in frictional contact. As the bristles 11 wear down, the brush head may be advanced to extend the bristles farther, this being allowed of by reason of the said slot 12 as will be readily apparent.

On the circumference of the member 3 are suitably embedded two lines of bristles 13 which are spaced apart and converge toward each other at approximately the center line of the collar 3 so as to work the cement continuously toward the joint 2 when the collar is operating adjacent the joint between the pipes as will be presently described.

The collar 3 is secured to a projecting yoke 14 which is in turn removably bolted to an operating spindle 15. This spindle 15 projects through a guide hole 16 in cross bars 17 in a guide collar 18. The position of the guide collar 18 on the spindle 15 is determined by a stop member 20 which may be a cotter pin or any other suitable member for the purpose. The spindle 15 is provided with a suitable operating handle 21.

In practice the sealing collar 3 is projected into one pipe section until it projects half way out of the end thereof. When in this position the guide collar 18 will be fitted in the opposite end of the pipe section and the handle 21 will project outside of the pipe section. The sealing cement being then properly applied, the protruding end of the sealing collar 3 is then projected into the adjacent pipe section and the joint 2 is made between the pipe sections in the usual manner. The handle 21 is then operated to rotate the spindle 15, incidentally the yoke 14 and the collar 3. This collar 3 having a slight resiliency expands to fit tightly within the two pipe sections at the junction thereof as clearly shown in Fig. 1. This brings the bristles 11 into close contact with the inner surface of both pipe sections at the joint and with the revolution of the sealing collar 3 this brush forces the cement thoroughly into the space between the adjacent ends of the pipe sections. The converging lines of bristles 13 continually work the cement toward the narrow end thereof which will be alined with the joint so that the cement will be continually working immediately adjacent the joint to allow of the best operation of the brush bristles 11. In addition to thoroughly forcing the cement into the joint, the brush bristles 11 will also sweep the interior surface of the pipe sections clean and make a nice smooth joint which will be thoroughly watertight.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A sealing device for pipe joints comprising a collar provided with a recess, a pin projecting across the recess, a brush having a head arranged to be disposed within the recess and having a slot to fit over the pin whereby the position of the brush in the recess may be moved to keep the bristles of the brush continuously projecting beyond the periphery of the collar, a wing nut on the pin adapted to clamp the sides of the recess against the brush head to hold the brush rigid within the recess, and means for rotating the collar.

2. A device of the character described comprising a collar carrying a brush, such collar being arranged to fit into pipe sections, means for rotating said collar when it is fitted into the joint between adjacent pipe sections, such means comprising a rotatable handle mounted on the collar and being of sufficient length to project outside of the pipe sections, a guide for such handle, such guide comprising a collar arranged to fit into the pipe section at a spaced distance from the first named collar, and guides carried by the last named collar through which guides the handle projects.

3. A device of the character described comprising a collar having a sealing brush, a double line of bristles on the collar converging toward each other near the center line of the collar, and means for rotating the collar.

4. A device of the character described comprising a collar split at one end and having overlapping edges, a brush carried by the collar, a yoke secured to the collar and projecting outwardly therefrom, a spindle removably secured to the yoke, another collar provided with centrally orificed cross bars, such spindle projecting through such orifices and being provided with a handle.

In testimony whereof I affix my signature.

EWALD M. SPIEKERMAN.

Copies of this patent may be obtained for five cents each, by addressing the "Commissioner of Patents, Washington, D. C."